Aug. 24, 1926.
J. W. LEE
1,597,606
MACHINE FOR SAWING ARCUATE SEGMENTS
Filed Sept. 18, 1924      5 Sheets-Sheet 4
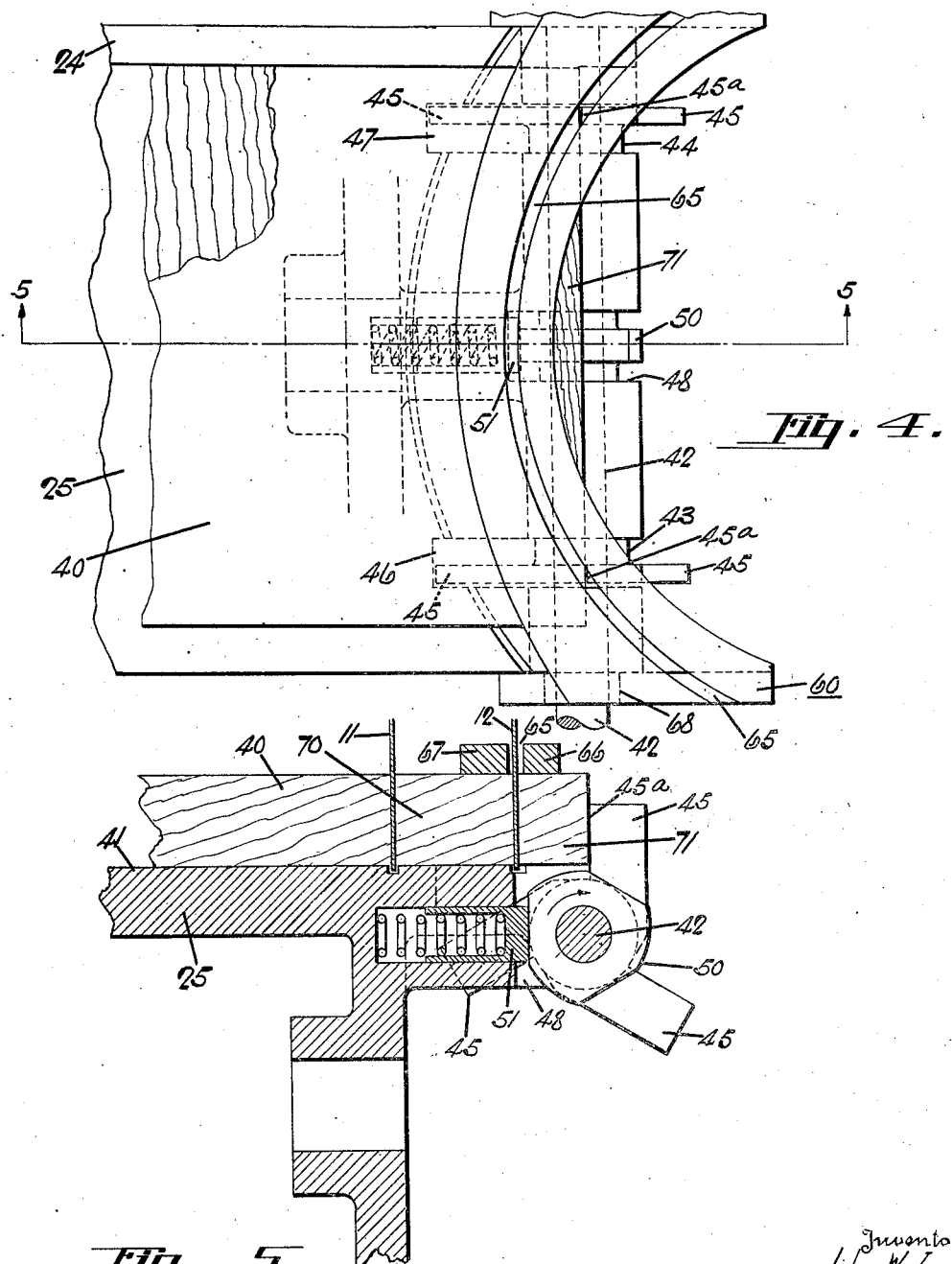

Patented Aug. 24, 1926.

1,597,606

UNITED STATES PATENT OFFICE.

JOHN W. LEE, OF DAYTON, OHIO, ASSIGNOR TO THE INLAND MANUFACTURING COMPANY, OF DAYTON, OHIO, A CORPORATION OF DELAWARE.

MACHINE FOR SAWING ARCUATE SEGMENTS.

Application filed September 18, 1924. Serial No. 738,530.

This invention relates to an automatic machine for sawing out arcuate segments from flat wood stock such as may be employed to form annular wooden articles such as steering wheel rims.

An object of this invention is to provide a machine which will saw out such segments much more rapidly, accurately and economically than has heretofore been done in any known manner.

A more specific object is to provide a machine having two concentrically mounted barrel saws against which the wood stock is adapted to pass thereby enabling both the outer peripheral cut and the inner peripheral cut to be made at one operation.

Other objects are to provide a clamping means which automatically grips the stock in all positions where it may be moved or knocked out of place by the saw, that is, both during the cutting movement and the withdrawal movement, and which automatically releases the cut off parts of the stock at the proper time to permit their removal and the feeding in of the stock for the succeeding cut.

Other objects are to provide automatic means for removing the cut-off parts of the stock at the proper time and permitting the proper feeding in of the stock for the succeeding cut.

A more general object is to arrange all the moving parts of the machine so that they will operate in a simple and reliable manner and so that they may be all driven by a single power means.

Other objects and advantages of the present invention will be apparent from the following description, reference being had to the accompanying drawings, wherein a preferred form of embodiment of the present invention is clearly shown.

In the drawings:

Fig. 4 is a plan view on an enlarged scale of the reciprocating table and illustrates in particular the spring-pressed clamping yoke straddling the inner end of the piece of wood stock, and the intermittently rotatable stop means for properly locating the stock when it is fed in and for removing the sawed off portions after each cut;

Fig. 5 is a section on line 5—5 of Fig. 4 and illustrates how the slotted clamping yoke clamps both the arcuate segment and the waste block firmly in position upon the table until after they are withdrawn entirely clear of the concentric barrel saws. This figure also clearly illustrates the spring-pressed means for locating the intermittently rotatable stop means in one of its three positions;

Figure 1:
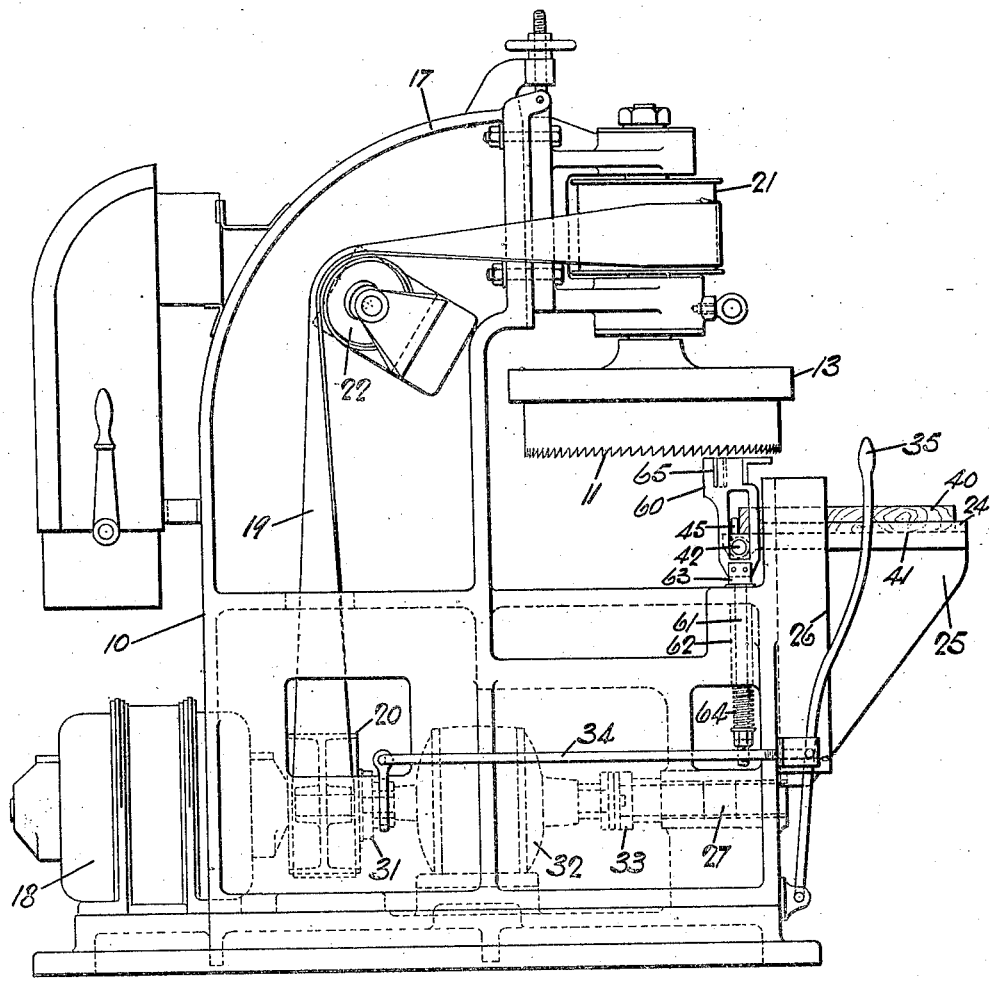
Fig. 1 is a side elevation of a machine designed according to this invention for sawing out arcuate segments from flat wood stock for making steering wheel rims.
Figure 2:
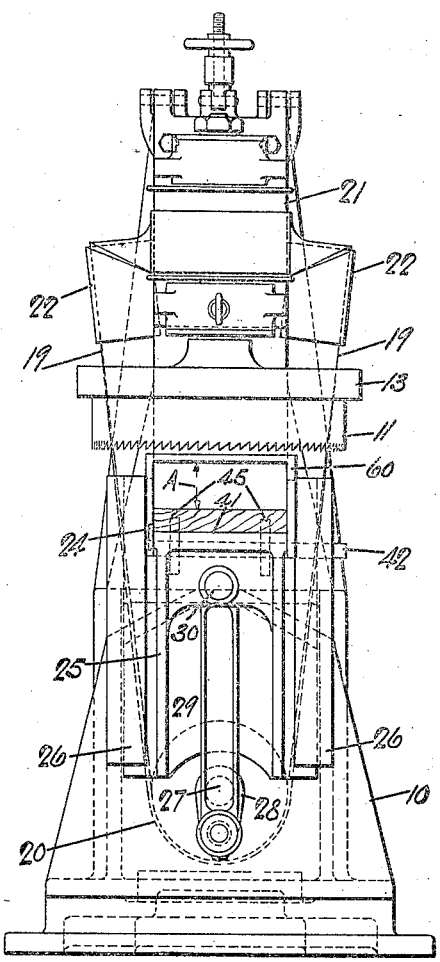
Fig. 2 is a front elevation of said machine.

In the drawings, similar reference characters refer to similar parts throughout the several views. Referring to Figs. 1, 2, and 3, 10 designates the heavy frame casting upon which the moving parts are suitably mounted. The two concentric barrel saws 11 and 12 are rigidly mounted within an annular groove in the rotating head 13 by the wedging or gripping rings 14 and the bolts 15 as clearly shown in Fig. 3. The head 13 is fixed upon the vertical shaft 16 which is mounted upon an overhanging portion 17 of the frame 10 in suitable bearings such as clearly shown in Fig. 3. The saws are driven by the electric motor 18 through the belt 19 and pulleys 20, 21 and guide pulleys 22.

A vertically reciprocating table 25 is suitably mounted to move in vertical guides 26 rigidly mounted upon the machine frame. The table 25 is reciprocated by the shaft 27 having a crank 28 and the connecting rod 29 which is connected to the table 25 at the upper bearing pin 30 (see Figs. 2 and 3). This shaft 27 is driven at a suitable speed by the electric motor 18 through a suitable clutch mechanism indicated at 31 in Fig. 1, a suitable reduction gearing enclosed in the housing 32 and the shaft coupling 33.

Since such clutch mechanisms and reduction gearing are well known in the art they will not be illustrated and described in detail herein. The manual lever 35 is located near the operator's position and its movement controls the clutch 31 through the link 34 as will be clear from Fig. 1. By shifting the manual lever 35 the operator may throw out clutch 31 at any time desired and thus quickly stop the movement of the table 25 without stopping the motor 18 or the barrel saws 11 and 12.

The table 25 is provided with a flat top surface 41 but has a flange 24 on one side thereof and is adapted to receive a piece of wood stock 40 placed thereupon by the operator of the machine into the position shown in Fig. 1.

The reciprocating table 25 has rotatably mounted upon the inner end thereof and not far below its top surface 41 a small horizontal shaft 42 (see Figs. 4 and 5). This shaft 42 has rigidly mounted thereupon two indexing stop spiders 43 and 44 each having three projecting stop fingers 45 which are rotatable with shaft 42 within the clearance slots 46 and 47 in the table 25, as clearly shown in Fig. 4. An indexing cam 50 is also rigidly mounted upon shaft 42, preferably at the center of table 25, and is rotatable within the clearance slot 48 in the table 25 (see Figs. 4 and 5). A spring-pressed plunger 51 rides upon the cam 50 when shaft 42 is intermittently rotated through approximately 120 degrees, as will be hereinafter described, and locates cam 50 with one of the three flats thereon in a vertical position. When in this position each of the two stop spiders 43 and 44 is in such position that each has a stop finger 45 projecting vertically upward, as clearly shown in Fig. 5. Of course for each rotation of shaft 42 through 120 degrees in the direction of the arrow shown in Fig. 5, the next succeeding pair of stop fingers 45 will be in vertical position, and so on continuously. The two upwardly projecting fingers 45 serve as a stop means for limiting the inward thrust by the operator of the piece of wood stock 40 at the two points 45a, as clearly shown in Figs. 4 and 5.

The means for clamping the wood stock 40 rigidly with the reciprocating table 25 during the sawing operation and until the saw is withdrawn entirely clear of the saw cuts will now be described. This means comprises a vertically reciprocable yoke 60 having two shanks 61, one on each side thereof, said shanks 61 being mounted in suitable guides 62 in the stationary machine frame 10 (see Figs. 1, 2 and 3). This yoke 60 is positioned normally immediately under the barrel saws and above the inner end of table 25 as clearly shown, the downward movement of yoke 60 being limited by a shoulder or collar 63 on each of the two shanks 61. The horizontal portion and the legs of the yoke 60 are provided with an arcuate slot 65 which provides sufficient clearance for the movement therein of the inner saw 12. This arcuate slot 65 therefore divides the yoke 60 into an inner yoke 66 which has a vertical movement within the projected periphery of the inner saw 12 and an outer yoke 67 which has a vertical movement within the annular space lying between the projected peripheries of the two barrel saws, as clearly shown in Figs. 4 and 5. The yoke 60 is urged downwardly at all times by the two strong coil springs 64 surrounding the lower projecting ends of the shanks 61, the tension of said springs 64 being suitably adjustable by means of the nuts 59 threaded upon the shanks 61, all as clearly shown in Figs. 1 and 3.

The operation of yoke 60 is as follows: The operator places a piece of wood stock 40 upon the top surface 41 of table 25 and slides the stock laterally until the left edge thereof abuts the guide flange 24 and inwardly until its inner edge abuts the stop fingers 45, the stock 40 being then in the position shown in Fig. 4. It is to be understood that the operator places the stock in this position while table 25 continues to have its vertical reciprocal movement. The table 25 moves up carrying stock 40 loosely thereupon for the distance "A" (see Fig. 2) whereupon the top surface of stock 40 engages the lower surface of the yoke 60 and from that point carries the yoke 60 upwardly toward the saws against the resistance of the two compression springs 64. It is thus seen that the stock 40 will be very firmly clamped in its proper position by the yoke 60 just before the saws 11 and 12 engage the stock. As previously described, the yoke 60 clears both saws 11 and 12 and hence the stock 40 is engaged by the two saws upon its further upward movement. The outer saw 11 makes the outer peripheral cut and the inner saw 12 makes the inner peripheral cut of the arcuate segment 70. The block 71 cut off the inner end of the stock by saw 12 is waste. After the saws have cut entirely through the stock, as shown in Fig. 5, the segment 70 will be held firmly clamped to table 25 by the outer yoke 67 and the waste block 71 will be held firmly clamped by the inner yoke 66 until the downward movement of table 25 has entirely withdrawn the saws 11 and 12 from their respective cuts, that is, until the downward movement of yoke 60 is arrested at the position shown in Figs. 1, 2 and 3 by the collar 63 striking its stop. The table 25 of course continues to move downwardly after the yoke 60 has released the segment 70 and block 71.

Figure 3:
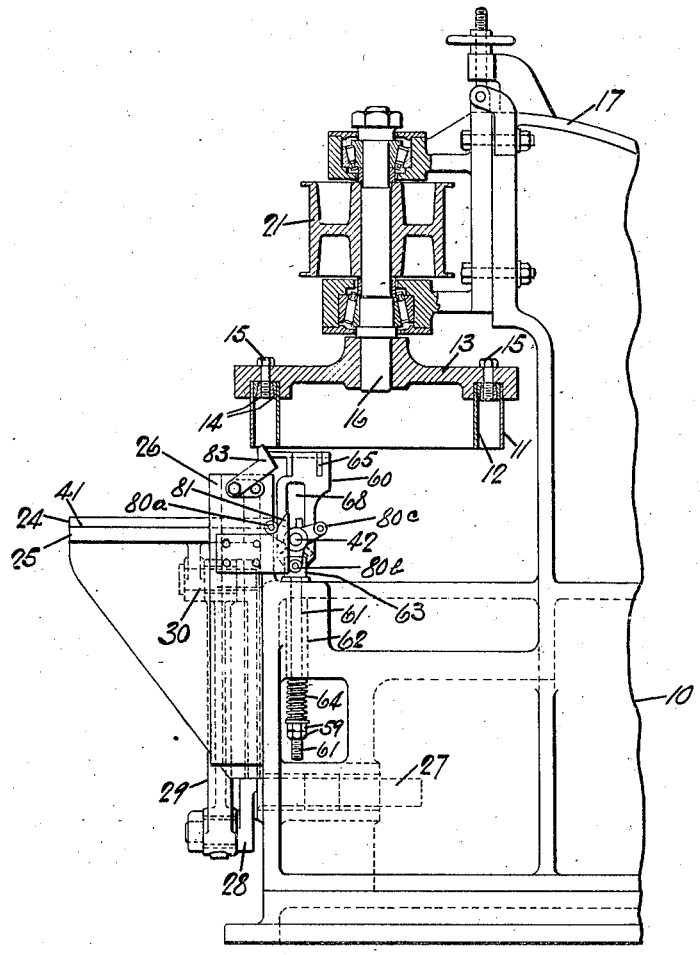
Fig. 3 is a view showing the barrel saw in section and an elevation of the reciprocating table from the opposite side from that shown in Fig. 1, and illustrating in particular the spring-pressed clamping yoke for holding the wood stock fixed upon the table when adjacent the saw, and the cam-operated intermittently rotatable stop means for removing the sawed off portions after each cut.
Figure 6:
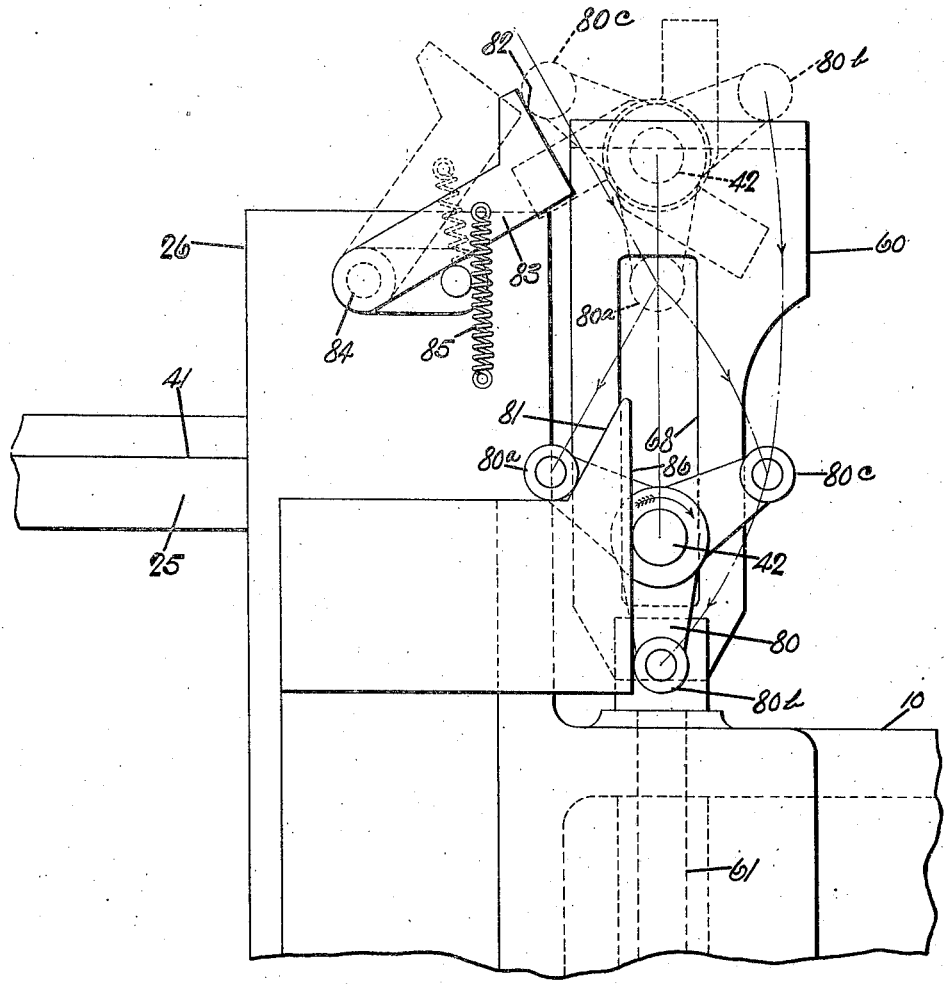
Fig. 6 shows on an enlarged scale the camming means for rotating the stop means through 120 degrees for each cycle of the reciprocating table.

The mechanism for automatically removing the segment 70 and block 71 now lying loosely on table 25 will now be described. The horizontal shaft 42 carried by table 25 projects on the right hand side of the machine, as viewed by the operator, through a clearance slot 68 in the vertical leg yoke 60 (see Figs. 2, 3, 4 and 6). Upon this projecting end of shaft 42 is fixed a three-armed spider 80 having the three arms thereof arranged at 120 degress and the three cam rollers 80ª, 80ᵇ and 80ᶜ rotatably mounted upon the ends of the arms as shown in Figs. 3 and 6. These cam rollers are arranged to ride upon the stationary cams 81 and 86 fixed upon the table guide bar 26 and upon the cam surface 82 of the swinging pawl 83 which is pivoted at 84 upon the guide bar 26 (as clearly shown in Figs. 3 and 6) when the shaft 42 is given a vertically reciprocating movement by table 25. When the cam rollers are in the position shown in dotted lines in Fig. 6, the cam roller 80ᶜ has just descended upon the cam surface 82. As shaft 42 descends further, the roller 80ᶜ riding upon the incline 82 rotate shaft 42 through a certain angle. By the time roller 80ᶜ has run off the lower tip of cam 82, the roller 80ª has been moved to a position vertically above the stationary cam 81 and hence further descent of shaft 42 will cause roller 80ª to move down the incline 81 and thus rotate shaft 42 an additional angle. The two cams 82 and 81 together thus rotate shaft 42 substantially 120 degrees, while the cam rollers 80ª, 80ᵇ and 80ᶜ follow a path of movement substantially as shown by the dot and dash lines indicated in Fig. 6. The spring-pressed plunger 51 riding upon the indexing cam 50 correctly locates the stationary positions of shaft 42 so that after each intermittent rotation thereof a pair of stop fingers 45 will project vertically upward as shown in Fig. 5. The operator feeds the stock in against the two vertical stop fingers 45, as described hereinabove. A positive stop means for preventing the forward rotation of the stop fingers 45 due to the thrust of the stock is provided by the cam roller 80ᵇ engaging the stationary vertical cam surface 86 during the upward movement of table 25. During the upward movement of table 25 shaft 42 is also held from backward rotation by said plunger 51 pressing against one of the flats on cam 50, as clearly shown in Fig. 5. Therefore the cam roller directly under the pawl 83 will engage the underside thereof when shaft 42 moves up and move said pawl to the dotted position shown in Fig. 6. As soon as the cam roller has cleared the pawl 83 it returns to its camming position (shown in full lines in Fig. 6) under the urge of the small tension coil spring 85. The parts will then be in proper position for the next downward movement of the table 25.

In the downward movement of table 25 one of the cam rollers engages cam 82 at or near the beginning of the down stroke. The further downward movement of table 25 will therefore cause the shaft 42 to begin rotating, as described above, in the direction of the arrow shown in Fig. 5. The two vertical fingers 45 will therefore move out of the way and the next pair of fingers 45 will move up and engage the underside of the segment 70 and block 71. Just before such engagement however the clamping yoke 60 releases the segment 70 and block 71 as described above, and hence the fingers 45 when moving to the vertical position will lift the segment 70 and block 71 from the table 25 and throw them off the end of the table 25 to the right as viewed in Figs. 3, 4 and 5. The segment and block will then fall upon a suitable inclined chute (not shown for the sake of clarity in the drawings) and slide to one side of the machine by gravity. Or of course the segment and block could be removed by any desired means such as a conveyor belt, or by hand. As soon as the fingers 45 have moved to the vertical stop-forming position the operator again feeds the piece of stock 40 against said fingers while the table 25 is ascending but before the stock engages yoke 60. The distance "A" (see Fig. 2) is made sufficiently great to enable the operator to easily do this. If desired automatic feeding means could be devised for feeding the stock forward to the proper position each time instead of the stock being fed in manually by the operator. Attention is called to the fact that in Fig. 2 the spider 80 mounted upon the projecting end of shaft 42 and the stationary cam 81 and pawl 83 have been omitted for the sake of clearness of illustration.

Various modifications may be made in the machine herein illustrated and described wihtout departing from the principles of the invention as defined by the appended claims. For example, for certain kinds of arcuate segments it may not be necessary that the inner and outer peripheral cuts of the segments be concentric. In that case one of the barrel saws may be dispensed with and there will then be no waste block to be cut off with each segment. However the clamping means and the automatic segment-removing means may still be used to great advantage with the single barrel saw.

While the forms of embodiment of the invention as herein disclosed, constitute preferred forms, it is to be understood that other forms might be adopted, all coming within the scope of the claims which follow. What I claim is as follows:

1. In a machine for sawing arcuate segments from flat stock, in combination, two concentrically mounted rotary saws, a reciprocating table upon which the stock is placed and moved thereby against said saws, a stop means carried by said table and against which one end of the stock is adapted to abut for proper location thereof in the path of the saws, and automatic means for intermittently rotating said stop means after each cut to remove the cut off portions.

2. In a machine for sawing arcuate segments from flat stock, in combination, a cylindrical saw, a reciprocating table upon which the stock is placed and moved thereby against said saw, a stop means carried by said table and against which one end of the stock is adapted to abut for proper location thereof in the path of the saw, and automatic means for intermittently rotating said stop means after each cut in such manner as to remove the cut off portion and to permit the feeding of the stock to proper position for the succeeding cut.

3. In a machine for sawing arcuate segments from flat stock, in combination, two concentrically mounted rotary saws, a reciprocating table upon which the stock is placed and moved thereby against said saws, a stop means carried by said table and against which one end of the stock is adapted to abut for proper location thereof in the path of the saws, a spring-pressed holding means engaged by said stock upon the movement of said table adjacent said saws whereby the stock is held rigidly positioned upon said table when adjacent said saws, and automatic means for rotating said stop means after the release of said holding means to remove the cut off portions.

4. In a machine for sawing arcuate segments from flat stock, in combination, two concentrically mounted rotary saws, a reciprocating table upon which the stock is placed and moved thereby against said saws, a stop means carried by said table and against which one end of the stock is adapted to abut for proper location thereof in the path of the saws, a spring-pressed holding means engaged by said stock upon the movement of said table adjacent said saws whereby the stock is held rigidly positioned upon said table when adjacent said saws, and automatic means for moving said stop means after the release of said holding means in such a manner as to remove the cut off portions and to permit the feeding of the stock to proper position for the succeeding cut.

5. In a machine for sawing arcuate segments from flat stock, in combination, two concentrically mounted rotary saws, a reciprocating table upon which the stock is placed and moved thereby against said saws, a stop means carried by said table and against which one end of the stock is adapted to abut for proper location thereof in the path of the saws, a spring-pressed holding means engaged by said stock upon the movement of said table adjacent said saws whereby the stock is held rigidly positioned upon said table when adjacent said saws, and means for moving said stop means after each cut in such a way as to remove the cut off portions.

6. In a machine for sawing segments from flat stock, in combination, a barrel rotary saw, a reciprocating table for holding the stock and moving the same against said saw, stop means carried by said table and against which one end of the stop is adapted to abut for proper location thereof in the path of said saw, and means for moving said stop means after each cut in such a way as to remove the cut off portion of the stock and to stop at a normal stop-forming position.

In testimony whereof I hereto affix my signature.

JOHN W. LEE.